United States Patent
Wang et al.

(10) Patent No.: US 12,447,224 B2
(45) Date of Patent: Oct. 21, 2025

(54) AUTOMATED DISINFECTION SYSTEM FOR CT PATIENT TABLE

(71) Applicant: Siemens Shanghai Medical Equipment Ltd., Shanghai (CN)

(72) Inventors: Wei Wang, Shanghai (CN); Min Sun, Shanghai (CN); Hong De Mu, Shanghai (CN); Jie Qing Liu, Shanghai (CN); Chang Qing Teng, Shanghai (CN); Yi Zhi Ma, Shanghai (CN)

(73) Assignee: Siemens Shanghai Medical Equipment Ltd., Shanghai (CN)

( * ) Notice: Subject to any disclaimer, the term of this patent is extended or adjusted under 35 U.S.C. 154(b) by 305 days.

(21) Appl. No.: 18/547,181

(22) PCT Filed: Feb. 11, 2022

(86) PCT No.: PCT/CN2022/076071
§ 371 (c)(1),
(2) Date: Aug. 21, 2023

(87) PCT Pub. No.: WO2022/188590
PCT Pub. Date: Sep. 15, 2022

(65) Prior Publication Data
US 2024/0139365 A1     May 2, 2024

(30) Foreign Application Priority Data
Mar. 10, 2021 (CN) .......................... 202120512831.2

(51) Int. Cl.
*A61L 2/24* (2006.01)
*A61B 6/04* (2006.01)
*A61L 2/10* (2006.01)

(52) U.S. Cl.
CPC .................. *A61L 2/24* (2013.01); *A61L 2/10* (2013.01); *A61B 6/0407* (2013.01);
(Continued)

(58) Field of Classification Search
None
See application file for complete search history.

(56) References Cited

U.S. PATENT DOCUMENTS

| 2017/0112953 A1* | 4/2017 | Dayton | G08C 17/02 |
| 2019/0262487 A1* | 8/2019 | Gil | A61L 2/202 |
| 2021/0060767 A1* | 3/2021 | Guerrera | B25J 9/161 |

FOREIGN PATENT DOCUMENTS

| CN | 112043844 A | * 12/2020 | A61B 5/055 |
| KR | 101724481 B1 | * 4/2017 | A61L 2/10 |

OTHER PUBLICATIONS

Jun. 17, 2022 (PCT) International Search Report and Written Opinion—App. PCT/CN2022/076071.

* cited by examiner

*Primary Examiner* — Andrew Smyth
(74) *Attorney, Agent, or Firm* — Banner & Witcoff Ltd.

(57) ABSTRACT

The disclosure is directed to an automated disinfection system for a CT patient table, where the automated disinfection system for a CT patient table includes: a disinfection mechanism disposed above the CT patient table; a detection mechanism, disposed on the disinfection mechanism and configured to detect a position of the CT patient table; and a control mechanism, configured to communicate with the disinfection mechanism by using a communication interface, so as to control start/stop and operation of the disinfection mechanism, where the disinfection mechanism is configured to perform horizontal movement and vertical movement during scanning gaps of a plurality of patients, so as to disinfect a use surface of the CT patient table. The disclosure enables rapid and automated disinfection on the use surface of the CT patient table during scanning gaps of a plurality of patients, thereby reducing a risk of cross-infection and saving manpower.

17 Claims, 5 Drawing Sheets

(52) U.S. Cl.
CPC ........ *A61L 2202/11* (2013.01); *A61L 2202/14* (2013.01); *A61L 2202/24* (2013.01)

AUTOMATED DISINFECTION SYSTEM FOR CT PATIENT TABLE

CROSS-REFERENCE TO RELATED APPLICATIONS

The present application is a U.S. National Stage entry of PCT Application no. PCT/CN2022/076071, filed Feb. 11, 2022, which claims priority to and the benefit of China patent application no. CN 202120512831.2, filed on Mar. 10, 2021, the contents of each of which are incorporated herein by reference in their entireties.

TECHNICAL FIELD

The disclosure relates to the field of computed tomography (CT) devices, and in particular, to an automated disinfection system for a CT patient table.

BACKGROUND

In the medical field, CT devices are often used to diagnose or treat patients. During examination, a patient enters a scanning room and lies on a CT patient table that can be moved automatically, which moves by a corresponding distance as required for scanning by X-ray.

During the above examination, because the patient is in direct contact with the CT patient table, viruses may remain on the CT patient table after scanning, especially for the patient with epidemic respiratory infection. To avoid cross-infection, a use surface of the CT patient table or even ambient air in the scanning room needs to be disinfected after each patient is examined.

At present, air disinfection in the scanning room can be implemented in an automated manner by placing an ultraviolet disinfection lamp in the room and by means of air circulation. However, the device surface still needs to be disinfected by wiping disinfection reagents manually or irradiating with the ultraviolet disinfection lamp fixed in the scanning room for more than 30 minutes. The disinfection methods described above are time-consuming and cumbersome, and pose a potential infection risk to the operator.

Therefore, to solve the foregoing problems, a disinfection system that can automatically, quickly, and conveniently disinfect a surface of a CT patient table during scanning gaps of a plurality of patients is needed, and the disinfection system can merge a disinfection process into an existing workflow of a CT device.

SUMMARY

A main objective of the disclosure is to provide an automated disinfection system for a CT patient table, so as to solve a problem that disinfection cannot be performed automatically and rapidly on a use surface of a CT patient table.

To achieve the foregoing objective, according to an aspect of the disclosure, an automated disinfection system for a CT patient table is provided, where the automated disinfection system for a CT patient table includes: a disinfection mechanism disposed above the CT patient table; a detection mechanism, disposed on the disinfection mechanism and configured to detect a position of the CT patient table; and a control mechanism, configured to communicate with the disinfection mechanism by using a communication interface, so as to control start/stop and operation of the disinfection mechanism, where the disinfection mechanism is configured to perform horizontal movement and vertical movement during scanning gaps of a plurality of patients, so as to disinfect a use surface of the CT patient table.

In an embodiment, the automated disinfection system for a CT patient table is provided with the disinfection mechanism that can move horizontally and vertically and the detection mechanism, so that automatic and rapid disinfection on the CT patient table is implemented, and comprehensive disinfection of the CT patient table can be completed within scanning gaps of patients, without manual disinfection by an operator, thereby saving time and efforts. In addition, a remote operation can be controlled through the control mechanism that is communicatively connected to the disinfection mechanism, thereby avoiding a risk of cross-infection of the operator.

Further, the disinfection mechanism includes: a mounting member, installed on the ceiling and configured to move horizontally; a telescopic rod, where an upper end of the telescopic rod is fixedly connected to the mounting member, and the telescopic rod is configured to perform telescopic movement vertically; and a disinfection component, connected to a lower end of the telescopic rod and including a plurality of disinfection units, where the plurality of disinfection units are arranged to disinfect an upper surface and a side surface of the CT patient table.

A specific structure form of the disinfection mechanism determines that the disinfection mechanism can effectively implement horizontal and vertical movement, and the structure form is simple.

Further, the mounting member includes a sliding element that can be slidably engaged in a track formed on the ceiling. The horizontal movement of the disinfection mechanism is realized by cooperating the sliding element with the track, which is easy to implement and easy to control.

Further, the disinfection component is pivotally connected to the telescopic rod by using a hinge, so that the disinfection component can rotate relative to the telescopic rod.

A rotation setting manner of the disinfection component makes more flexible disinfection possible, so that a larger-range disinfection operation can be provided as required.

Further, the detection mechanism includes a first sensor and a plurality of second sensors positioned on the disinfection component, the first sensor is configured to sense a position of an end of the CT patient table in response to start of the disinfection mechanism, and when the position of the end of the CT patient table is sensed, the telescopic rod performs telescopic movement toward the CT patient table; and the second sensor is configured to sense a distance between the disinfection component and the CT patient table while the telescopic rod moves, when the distance between the disinfection component and the CT patient table is a first preset distance, the telescopic rod stops telescopic movement, and the disinfection mechanism moves horizontally by using the mounting member, so as to disinfect the upper surface and the side surface of the CT patient table.

A horizontal position of the CT patient table can be accurately determined by using a sensing result of the first sensor, and after the horizontal position is determined, an optimal disinfection distance is determined by using a sensing result of the second sensor. The cooperation between the moving part and the sensor helps to realize the precise positioning of the disinfection mechanism relative to the CT patient table and smooth implementation of the disinfection task.

Further, the second sensor is further configured to sense an obstacle in the horizontal direction when the disinfection mechanism moves horizontally.

The second sensor may further sense an obstacle in the horizontal direction, so that occurrence of a collision event is prevented when the disinfection mechanism moves horizontally in a disinfection process.

Further, the first preset distance is in a range of 195 mm-205 mm.

The preset distance is an optimal distance for effective disinfection.

Further, the disinfection mechanism moves horizontally by a second preset distance, and the second preset distance is not less than a length of the CT patient table.

The preset distance by which the disinfection mechanism moves horizontally is not less than the length of the CT patient table, so that the CT patient table can be completely disinfected.

Further, the first sensor is a distance sensor, and the plurality of second sensors are proximity sensors.

The distance sensor and proximity sensors are common types of sensors that can effectively sense positions and distances.

Further, each of the plurality of disinfection units is an ultraviolet LED (UVC LED).

An ultraviolet disinfection lamp replaces a traditional mercury lamp, and using the ultraviolet LED achieves benefits of energy saving, environmental protection, and compactness.

Further, an operating power and a moving speed of the disinfection mechanism are adjustable to achieve different disinfection rates.

By setting the operating power and moving speed of the disinfection mechanism as adjustable, different disinfection rates can be achieved, thus realizing on-demand disinfection.

Further, the automated disinfection system for a CT patient table further includes a start button and a stop button that are both disposed on a CT gantry.

The start button and stop button can be set as an alternative for use in case of a system fault or emergency.

Further, the automated disinfection system for a CT patient table is further configured such that the disinfection component of the disinfection mechanism can rotate by a predetermined angle toward a CT gantry to disinfect the CT gantry.

The automated disinfection system of the disclosure may also be extended to disinfect a surface of the CT gantry.

Further, the automated disinfection system for a CT patient table is further configured such that the disinfection mechanism operates in a predetermined low power mode to disinfect ambient air.

The automated disinfection system of the disclosure may be further extended to disinfect ambient air in a scanning room.

By using the technical solutions of the embodiments of the disclosure, the disinfection mechanism that can move horizontally and vertically and the detection mechanism can be disposed, so that rapid and automated disinfection of the use surface of the CT patient table can be implemented during scanning gaps of a plurality of patients, thereby reducing a risk of cross-infection and saving manpower. According to the embodiments of the disclosure, the automated disinfection system for a CT patient table may be directly configured based on an existing CT device, and software and hardware of a current system need not be modified, thereby implementing convenient operation. In addition, according to the embodiments of the disclosure, the automated disinfection system for a CT patient table may further disinfect air in the scanning room and the surface of the CT gantry.

BRIEF DESCRIPTION OF THE DRAWINGS

The accompanying drawings that constitute a part of this application are used to provide a further understanding of the disclosure. Exemplary embodiments of the disclosure and descriptions of the embodiments are used to explain the disclosure, and do not constitute any inappropriate limitation to the disclosure. In the accompanying drawings.

Figure 1:
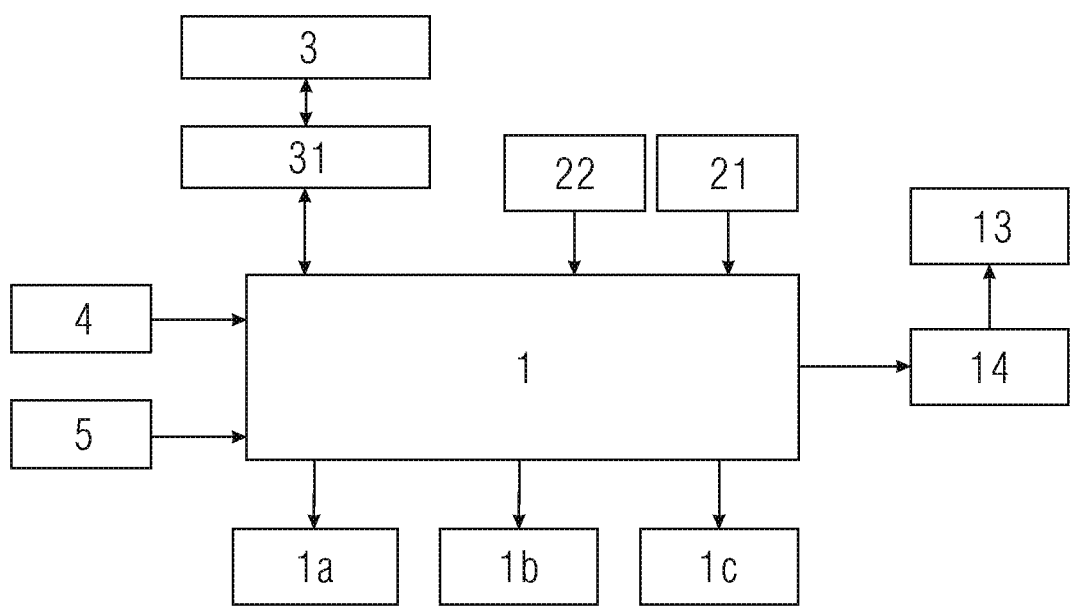
FIG. 1 is a block diagram of an example automated disinfection system for a CT patient table according to an embodiment of the disclosure.

The foregoing accompanying drawings include the following reference numerals:
1. disinfection mechanism, 11. mounting member, 12. telescopic rod, 13. disinfection component, 131. disinfection unit, 14. LED driver, 1a. horizontal moving part, 1b. vertical moving part, and 1c. rotation part.
21. first sensor and 22. second sensor;
3. control mechanism and 31. communication interface;
4. start button;
5. stop button;
10. CT patient table;
20. CT gantry.

DETAILED DESCRIPTION OF THE DISCLOSURE

The following clearly and completely describes the technical solutions in the embodiments of this disclosure with reference to the accompanying drawings in the embodiments of this disclosure. The described embodiments are some of the embodiments rather than all of the embodiments. The following description of at least one exemplary embodiment is illustrative and is not intended to limit this disclosure or the application or use of this disclosure. Other embodiments obtained by a person of ordinary skill in the art based on the embodiments of this disclosure fall within the protection scope of this application.

It should be noted that terms used herein are for the purpose of describing specific implementations and are not intended to limit the exemplary implementations of this disclosure. As used herein, the singular form is intended to include the plural form, unless the context clearly indicates otherwise. In addition, it should further be understood that terms "comprise" and/or "include" used in this disclosure indicate that there are features, steps, operations, devices, components, and/or combinations thereof.

Unless otherwise specified, the relative deployment, the numerical expression, and values of the components and steps described in the embodiments do not limit the scope of this disclosure. In addition, it should be understood that, for ease of description, sizes of parts shown in the accompanying drawings are not drawn according to an actual proportional relationship. Technologies, methods, and devices known to a person of ordinary skill in the art may not be discussed in detail, but in proper circumstances, the technologies, methods, and devices shall be regarded as a part of the specification. In all examples that are shown and discussed herein, any specific value should be interpreted only as an example and not as a constraint. Therefore, other examples of the exemplary embodiments may have different values. It should be noted that similar reference signs or letters in the accompanying drawings indicate similar items. Therefore, once an item is defined in one accompanying drawing, the item does not need to be further discussed in the subsequent accompanying drawings.

According to an aspect of the disclosure, an automated disinfection system for a CT patient table is provided, where the automated disinfection system for a CT patient table includes: a disinfection mechanism disposed above the CT patient table; a detection mechanism, disposed on the disinfection mechanism and configured to detect a position of the CT patient table; and a control mechanism, configured to communicate with the disinfection mechanism by using a communication interface, so as to control start/stop and operation of the disinfection mechanism, where the disinfection mechanism is configured to perform horizontal movement and vertical movement during scanning gaps of a plurality of patients, so as to disinfect a use surface of the CT patient table.

Figure 2:
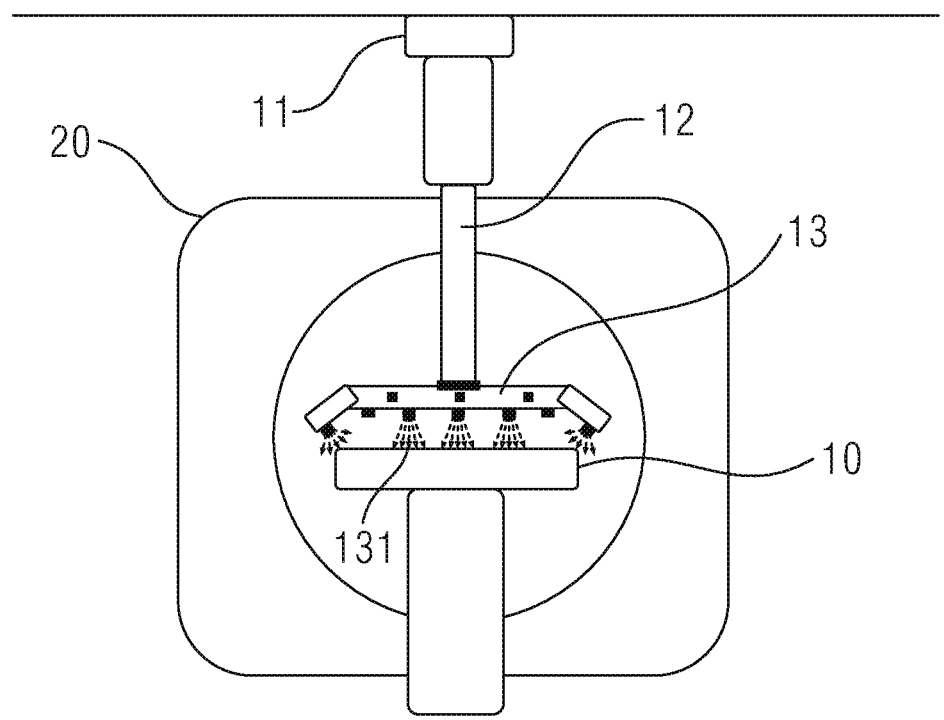
FIG. 2 is a front view of an example disinfection mechanism of an automated disinfection system for a CT patient table according to an embodiment of the disclosure.
Figure 3:
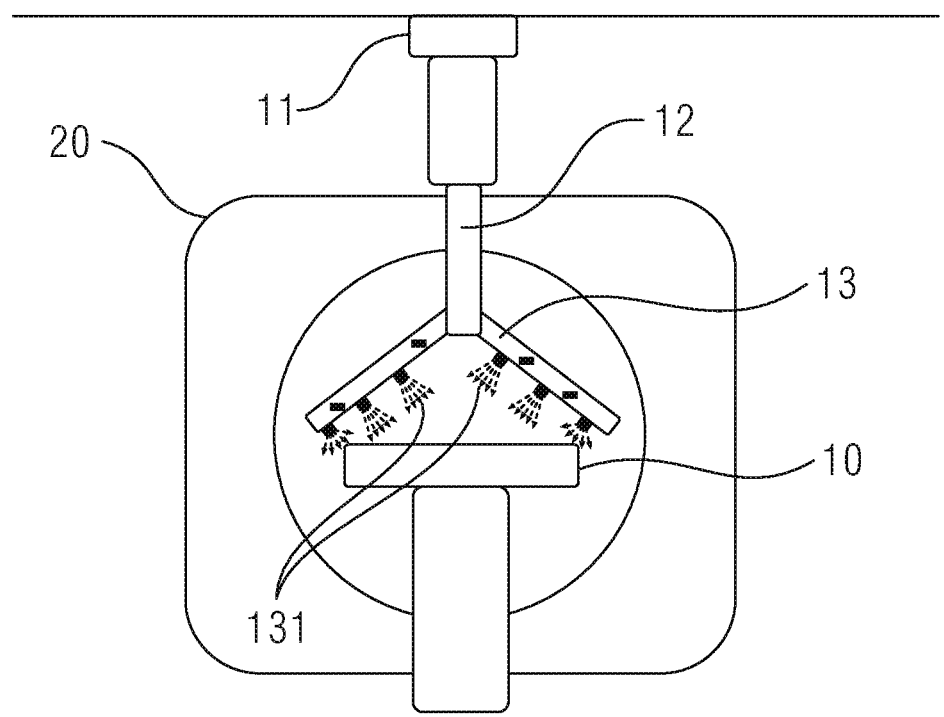
FIG. 3 shows another example arrangement of disinfection units of the disinfection mechanism of FIG. 2.
Figure 4:
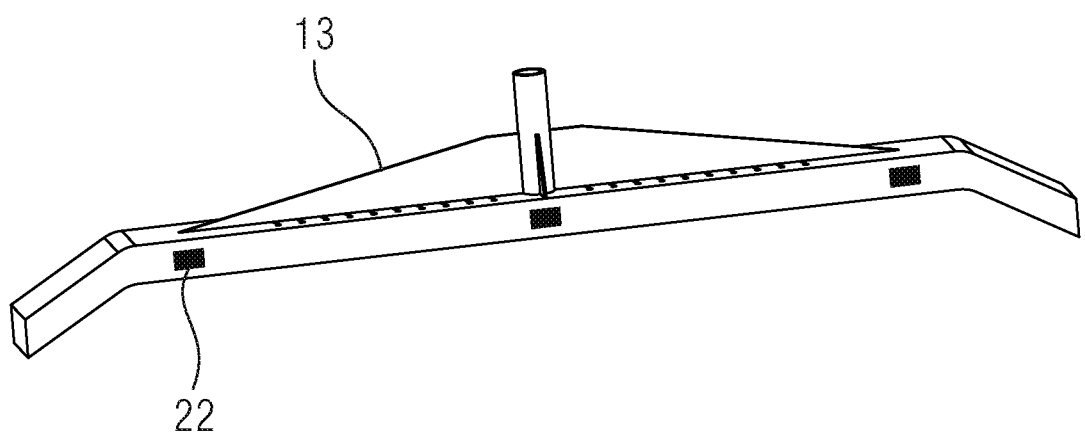
FIG. 4 is a perspective view of an example disinfection component of the disinfection mechanism of FIG. 2.
Figure 5:
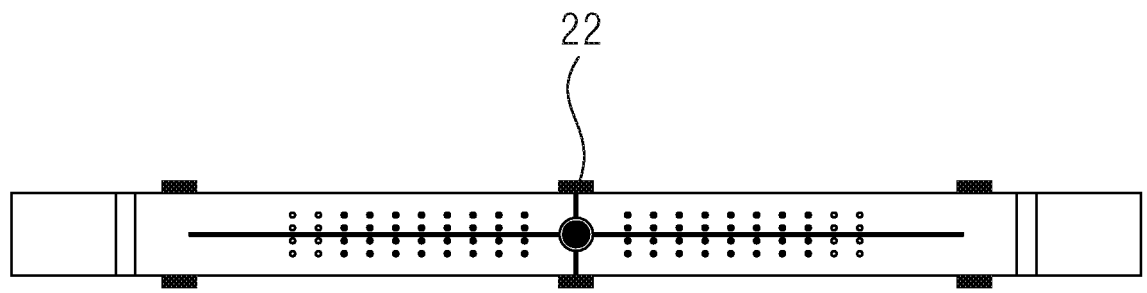
FIG. 5 is a top view of an example disinfection component of the disinfection mechanism of FIG. 2.
Figure 6:
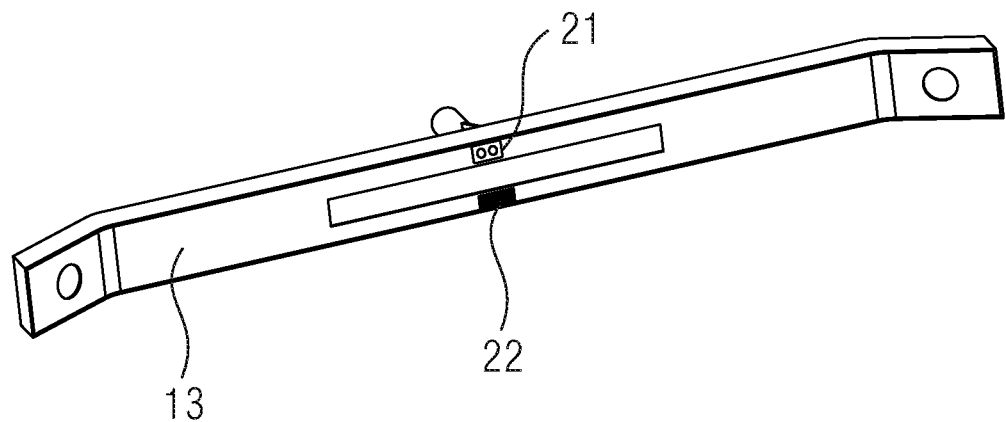
FIG. 6 is a bottom perspective view of an example disinfection component of the disinfection mechanism of FIG. 2.
Figure 7:
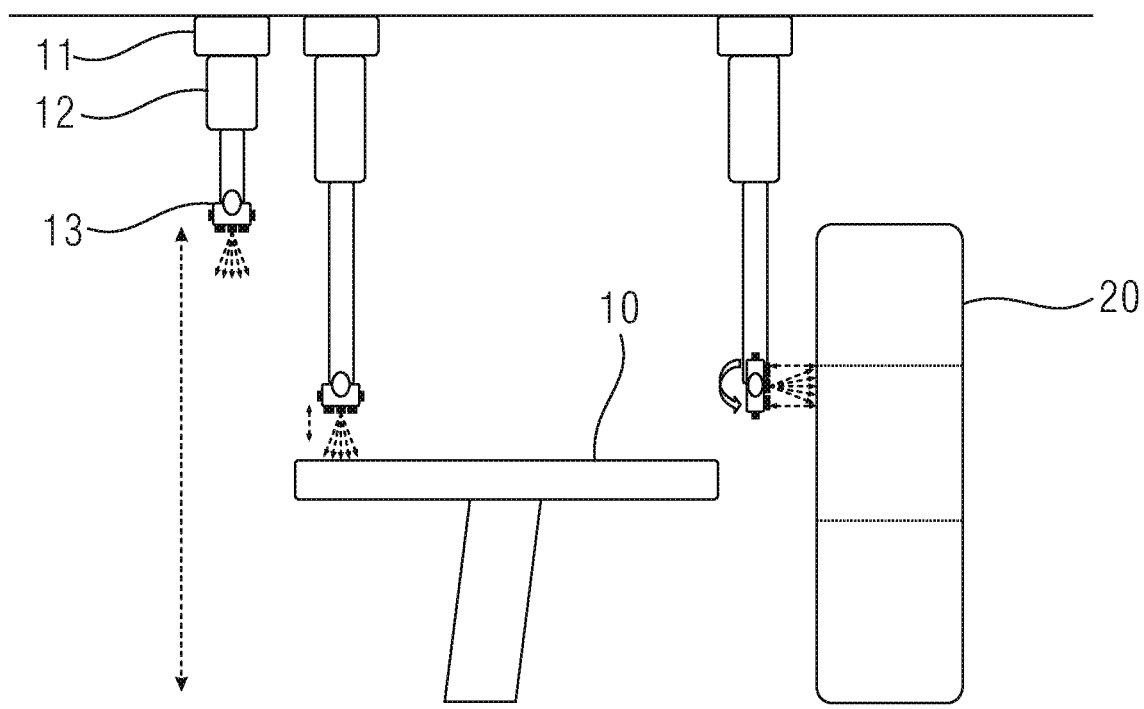
FIG. 7 is a schematic diagram of an example disinfecting a CT patient table and an example CT gantry by an automated disinfection system for an example CT patient table according to an embodiment of the disclosure.

FIG. 1 is a block diagram of an automated disinfection system for a CT patient table according to an embodiment of the disclosure; FIG. 2 is a front view of a disinfection mechanism of an automated disinfection system for a CT patient table according to an embodiment of the disclosure; FIG. 3 shows another arrangement of disinfection units of the disinfection mechanism of FIG. 2; FIG. 4 is a perspective view of a disinfection component of the disinfection mechanism of FIG. 2; FIG. 5 is a top view of a disinfection component of the disinfection mechanism of FIG. 2; FIG. 6 is a bottom perspective view of a disinfection component of the disinfection mechanism of FIG. 2; and FIG. 7 is a schematic diagram of disinfecting a CT patient table and a CT gantry by an automated disinfection system for a CT patient table according to an embodiment of the disclosure. An automated disinfection system for a CT patient table is provided. FIG. 1 shows an example automated disinfection system for a CT patient table according to an embodiment of the disclosure. The automated disinfection system includes a disinfection mechanism 1, a detection mechanism, and a control mechanism 3. The disinfection mechanism 1 is disposed above a CT patient table 10 and is configured to disinfect a use surface of the CT patient table during scanning gaps (for example, 2 minutes) of a plurality of patients. The use surface includes an upper surface in contact with a patient and a side surface that the patient's body may contact. In addition, the disinfection mechanism 1 may move horizontally and vertically when disinfecting the use surface of the CT patient table 10, where the disinfection mechanism may include a horizontal moving part 1a and a vertical moving part 1b. The detection mechanism is associated with the disinfection mechanism 1 and is used to detect a position of the CT patient table 10 relative to the disinfection mechanism 1. The detection mechanism may include a first sensor 21 and a second sensor 22, and a quantity of the first sensor and a quantity of the second sensor may be one or more. Details are described below. The control mechanism 3 may communicate with the disinfection mechanism 1 by using a communication interface 31, and is configured to control start/stop and operation of the disinfection mechanism 1. As a non-limiting example, the control mechanism 3 may be disposed at a remote position away from the disinfection mechanism 1, for example, a control room outside a scanning room, and integrated with a control system that controls a CT device.

FIG. 2 is a front view of an example disinfection mechanism 1 configured to disinfect a use surface of a CT patient table according to an embodiment of the disclosure. The disinfection mechanism 1 includes a mounting member 11, a telescopic rod 12, and a disinfection component 13. The mounting member 11 is mounted on the ceiling of a scanning room, so that the disinfection mechanism 1 can be suspended downward from the ceiling. In an embodiment, a sliding element may be disposed on the mounting member 11, and a track may be disposed on the ceiling, so that the sliding element is slidably engaged in the track, so that the disinfection mechanism 1 can move in horizontally relative to the CT patient table. Certainly, other structural forms that can realize horizontal movement of the disinfection mechanism 1 may also be used without exceeding the scope of the disclosure. The telescopic rod 12 is fixedly connected to the mounting member 11 at an upper end, and the telescopic rod may be configured to perform telescopic movement vertically relative to the mounting member 11. The telescopic rod 12 is connected to the disinfection component 13 at a lower end, so that the disinfection component can move vertically as the telescopic rod 12 moves. Optionally, the disinfection component 13 may include a rotation part 1c, so that the disinfection component can rotate relative to the telescopic rod 12, for example, the disinfection component may be pivotally connected to the telescopic rod 12 by using a hinge.

In addition, the disinfection component 13 may include a plurality of disinfection units 131. The disinfection units are distributed on a lower surface of the disinfection component in an array, and disinfect the use surface of the CT patient table. Specifically, a distribution manner of the plurality of disinfection units 131 enables disinfection on both an upper surface and a side surface of the CT patient table. In an embodiment, the plurality of disinfection units 131 use ultraviolet LEDs (UVC LED). However, without exceeding the scope of the disclosure, the disinfection unit may also use other forms that can effectively disinfect the use surface of the CT patient table.

Advantageously, according to different disinfection requirements, the structure of disinfection component 13 is variable. For example, the disinfection component 13 may include a plurality of arms that are hinged and angularly disposed relative to each other. As shown in FIG. 2, in a case in which comprehensive disinfection needs to be performed on the use surface of the CT patient table, a first end arm and a second end arm at both ends of the disinfection component 13 may be disposed at an angle with respect to a first middle arm and a second middle arm at middle positions, so that the disinfection units 131 disposed at the first end arm and the second end arm can emit ultraviolet light toward the side surface of the CT patient table, and the disinfection units 131 disposed at the first middle arm and the second middle arm can emit ultraviolet light toward the upper surface of the CT patient table. As shown in FIG. 3, in a case in which emphasis needs to be placed on disinfecting the side surface of the CT patient table, the first middle arm and the second middle arm of the disinfection component 13 may be disposed at an angle relative to each other, the first middle arm and the first end arm may be disposed in a straight line, and the second middle arm and the second end arm are disposed in a straight line.

A first sensor 21 and a second sensor 22 of the detection mechanism are described with reference to FIG. 4 to FIG. 6. As shown in FIG. 6, in an embodiment of the disclosure, the first sensor 21 is disposed on a lower surface of the disinfection component 13, and when the disinfection mechanism starts to move horizontally, the first sensor may sense a position of an end of the CT patient table. In this embodiment of the disclosure, the first sensor 21 is a distance sensor, and detection precision of the first sensor is +/−60 mm A plurality of second sensors 22 are disposed on the disinfection component 13. One second sensor 22 is disposed on the lower surface of the disinfection component 13 and is positioned adjacent to the first sensor 21. As shown in FIG. 6, the second sensor 22 may be configured to sense a distance between the disinfection component and the CT patient table when the disinfection component 13 moves downward toward the CT patient table by means of telescopic movement of the telescopic rod 12. When the distance reaches a first preset distance, the telescopic rod 12 stops telescopic movement. As an example, the first preset distance is in a range of 195 mm-205 mm, such as 200 mm. Further, as shown in FIG. 4 and FIG. 5, several second sensors in the second sensors 22 may be disposed on two sides of the disinfection component 13; for example, each side has three second sensors. The second sensors 22 disposed on the sides of the disinfection component may be configured to sense an obstacle in the horizontal direction when the disinfection mechanism moves horizontally to disinfect the CT patient table, so as to prevent a collision. For example, when an obstacle is sensed at approximately 100 mm ahead, the disinfection mechanism 1 may stop moving horizontally. In addition, the disinfection mechanism 1 may move horizontally by a second preset distance at a specific speed (for example, 100 mm/s) along the CT patient table 10, where the second preset distance is not less than a length of the CT patient table, and for example, the second preset distance may be 2500 mm. In an embodiment of the disclosure, the second sensor 22 is a proximity sensor.

In an embodiment of the disclosure, an operating power and a moving speed of the disinfection mechanism 1 are adjustable to achieve different disinfection rates. For example, the disinfection unit 131 in the form of an ultraviolet LED of the disinfection mechanism 1 may operate in a low power mode, a medium power mode, or a high power mode.

Further, the automated disinfection system of the disclosure may further disinfect a CT gantry 20 and ambient air in a scanning room. When a patient is scanned, the patient may contact a surface of the CT gantry 20. Therefore, it is necessary to disinfect the surface of the CT gantry in scanning gaps of a plurality of patients. When disinfection is performed on the surface of the CT gantry, the disinfection component 13 of the disinfection mechanism 1 may rotate by a predetermined angle (for example, 90 degrees) towards the surface of the CT gantry relative to the telescopic rod 12, so as to disinfect the surface. In addition, when disinfection is performed on the ambient air in the scanning room, the disinfection mechanism 1 can move horizontally without moving vertically to operate in the low power mode.

Referring to FIG. 1, the automated disinfection system according to the disclosure may further include a start button 4 and a stop button 5 as an alternative or to be used manually by an operator in case of emergency. Both the start button 4 and the stop button 5 may be disposed on the CT gantry 20.

The following describes an operation of the automated disinfection system for a CT patient table according to the disclosure with reference to FIG. 7.

After scanning of a patient is complete, the CT patient table 10 returns to an initial position. An operator outside the scanning room may start the disinfection mechanism 1 by operating the control mechanism 3. The control mechanism may be integrated into a control system used for the CT device. For example, the operator may click a button such as "disinfect" displayed on a user interface of the control system to start a disinfection process. Then, the disinfection mechanism 1 moves horizontally by means of sliding of the mounting member 11 along the track on the ceiling, until the first sensor 21 senses a position of a first end of the CT patient table 10, and in this case, the disinfection mechanism 1 stops moving horizontally. The disinfection component 13 of the disinfection mechanism 1 moves downward toward the CT patient table 10 by using the telescopic rod 12, and the second sensor 22 senses a distance from the CT patient table. When the distance reaches the first preset distance, the telescopic rod 12 stops telescopic movement. In this case, an LED driver 14 used on the disinfection unit 131 of the disinfection component 13 activates the plurality of disinfection units 131 to start at a predetermined power, and the disinfection mechanism 1 moves horizontally again, so as to disinfect the use surface of the CT patient table 10 at a specific speed. The disinfection mechanism 1 returns when moving to a second end of the CT patient table 10. In this case, the disinfection unit 131 does not shut down, but continues to disinfect the use surface of the CT patient table. When the disinfection mechanism 1 returns to the first end of the CT patient table, the disinfection unit 131 shuts down, and the disinfection mechanism 1 returns to the initial position by using the horizontal moving part and the vertical moving part. As such, disinfection is completed, so that a next patient can be scanned.

It may be learned from the foregoing description that the embodiments of the disclosure achieve several technical effects:

By using the technical solutions of the disclosure, the disinfection mechanism that can move horizontally and vertically and the detection mechanism can be disposed, so that rapid and automated disinfection of the use surface of the CT patient table can be implemented during scanning gaps of a plurality of patients, thereby reducing a risk of cross-infection and saving manpower. According to the embodiments of the disclosure, the automated disinfection system for a CT patient table may be directly configured based on an existing CT device, and software and hardware of a current system need not be modified, thereby implementing convenient operation. In addition, according to the embodiments of the disclosure, the automated disinfection system for a CT patient table may further disinfect air in the scanning room and the surface of the CT gantry.

In the description of the disclosure, it should be understood that orientation or position relationships indicated by terms such as "front, back, upper, lower, left, right", "horizontal, vertical", and "top, bottom" are generally based on orientation or position relationships shown in the accompanying drawings, and are merely for ease of description of the disclosure and simplified description. In a case in which no opposite description is provided, the orientation terms do not indicate and imply that the specified apparatus or component must have a specific orientation or must be constructed and operated at a specific orientation, and are not understood to limit the protection scope of the disclosure. The orientation terms "inside and outside" refer to the inside and outside of the outline of each component.

For ease of description, spatial relative terms such as "on . . . ", "above . . . ", "at an upper surface of . . . ", "the above", and the like are used to describe a spatial position relationship between a component or feature shown in the figure and another component or feature. It should be understood that the spatial relative term is intended to include different orientations in use or operation in addition to the orientations of the component described in the figure. For example, if the component in the drawing is inverted, the component described as "above other components or constructions" or "on other components or constructions" will be positioned as "below other components or constructions" or "under other components or constructions". Thus, the exemplary term "above . . . " may include "above . . . " and "below . . . ". The component may also be positioned in different manners (rotated by 90 degrees or in another orientation), and the spatial relative description used herein is explained accordingly.

In addition, it should be noted that the terms such as "first", and "second" are used to define parts only to make it easier to distinguish the parts. Unless otherwise stated, the terms have no special meanings, and therefore cannot be construed as limiting the protection scope of the disclosure.

The foregoing descriptions are exemplary embodiments of the disclosure but are not intended to limit the disclosure. The disclosure may include various modifications and changes for a person skilled in the art. Any modification, equivalent replacement, or improvement made without departing from the spirit and principle of the disclosure should fall within the protection scope of the disclosure.

What is claimed is:

1. An automated disinfection system for a computed tomography (CT) patient table, comprising:
    a disinfection mechanism disposed above the CT patient table;
    a detection mechanism disposed on the disinfection mechanism and configured to detect a position of the CT patient table; and
    a control mechanism configured to communicate with the disinfection mechanism via a communication interface to control operation of the disinfection mechanism,
    wherein the disinfection mechanism is configured to move in a horizontal direction that is parallel to the CT patient table and in a vertical direction that is perpendicular to the CT patient table to disinfect a use surface of the CT patient table.

2. The automated disinfection system according to claim 1, wherein the disinfection mechanism comprises:
    a mounting member installed on a ceiling and configured to move in the horizontal direction;
    a telescopic rod configured to move in the vertical direction,
    wherein an upper end of the telescopic rod is fixedly connected to the mounting member; and
    a disinfection component connected to a lower end of the telescopic rod and comprising a plurality of disinfection lamps,
    wherein the plurality of disinfection lamps are configured to disinfect an upper surface and a side surface of the CT patient table.

3. The automated disinfection system according to claim 2, wherein the mounting member comprises a sliding element that is slidably engaged in a track formed on the ceiling.

4. The automated disinfection system according to claim 2, wherein the disinfection component is pivotally connected to the telescopic rod via a hinge such that the disinfection component is rotatable relative to the telescopic rod.

5. The automated disinfection system according to claim 2, wherein the detection mechanism comprises:
    a first sensor; and
    a second sensor positioned on the disinfection component.

6. The automated disinfection system according to claim 5, wherein:
    the first sensor is configured to sense a position of an end of the CT patient table in response to movement of the disinfection mechanism, and
    when the position of the end of the CT patient table is sensed, the telescopic rod performs telescopic movement in the vertical direction toward the CT patient table.

7. The automated disinfection system according to claim 6, wherein:
    the second sensor is configured to sense a distance between the disinfection component and the CT patient table during movement of the telescopic rod, and
    when the distance between the disinfection component and the CT patient table reaches a first preset distance, (i) the telescopic rod stops the telescopic movement, and (ii) the disinfection mechanism moves in the horizontal direction via the mounting member to disinfect the upper surface and the side surface of the CT patient table.

8. The automated disinfection system according to claim 7, wherein the second sensor is further configured to sense an obstacle in the horizontal direction when the disinfection mechanism moves in the horizontal direction.

9. The automated disinfection system according to claim 7, wherein the first preset distance is within a range of 195 mm-205 mm.

10. The automated disinfection system according to claim 7, wherein the disinfection mechanism is configured to move in the horizontal direction up to a second preset distance that is not less than a length of the CT patient table.

11. The automated disinfection system according to claim 7, wherein the first sensor comprises a distance sensor, and wherein the second sensor comprises a proximity sensor.

12. The automated disinfection system according to claim 2, wherein each of the plurality of disinfection lamps comprises an ultraviolet light-emitting diode (LED).

13. The automated disinfection system according to claim 1, wherein an operating power and a moving speed of the disinfection mechanism are adjustable to achieve different disinfection rates.

14. The automated disinfection system according to claim 1, further comprising:
    a start button; and
    a stop button,
    wherein the start button and the stop button are disposed on a CT gantry.

15. The automated disinfection system according to claim 2, wherein the automated disinfection system is further configured such that the disinfection component is rotatable by a predetermined angle towards a CT gantry to disinfect the CT gantry.

16. The automated disinfection system according to claim 1, wherein the automated disinfection system is further configured such that the disinfection mechanism operates in a first predetermined power mode to disinfect ambient air.

17. The automated disinfection system according to claim 16, wherein the first predetermined power mode used to disinfect the ambient air is lower than a second predetermined power mode that is used to disinfect the use surface of the CT patient table.

\* \* \* \* \*